United States Patent
Matuzawa

[11] Patent Number: 6,151,097
[45] Date of Patent: Nov. 21, 2000

[54] APPARATUS FOR FILLING UP A LIQUID CRYSTAL INJECTION HOLE IN A LCD CELL AND METHOD OF DOING THE SAME HAVING A DETECTOR OF RESIN LOCATION IN AN INJECTION HOLE

[75] Inventor: Tadashi Matuzawa, Tokyo, Japan

[73] Assignee: NEC Corporation, Tokyo, Japan

[21] Appl. No.: 09/233,119

[22] Filed: Jan. 19, 1999

[30] Foreign Application Priority Data

Jan. 20, 1998 [JP] Japan .................................. 10-008619

[51] Int. Cl.⁷ .................................................. G02F 1/1339
[52] U.S. Cl. .............................................................. 349/190
[58] Field of Search ................................... 349/153, 154, 349/190

[56] References Cited

U.S. PATENT DOCUMENTS 5,184,239  2/1993  Sano et al. .

FOREIGN PATENT DOCUMENTS

| 58-90617 | 5/1983 | Japan . |
| 59-149323 | 8/1984 | Japan . |
| 3-287226 | 12/1991 | Japan ...................................... 349/190 |
| 5-134260 | 5/1993 | Japan . |
| 6-160873 | 6/1994 | Japan . |
| 7-199199 | 8/1995 | Japan . |
| 8-160440 | 6/1996 | Japan . |
| 9-211474 | 8/1997 | Japan . |

*Primary Examiner*—Walter Malinowski
*Attorney, Agent, or Firm*—Sughrue, Mion, Zinn, Macpeak & Seas, PLLC

[57] ABSTRACT

There is provided an apparatus for filling up a hole formed with a liquid crystal display cell for introducing liquid crystal into the liquid crystal display cell therethrough, including (a) a cell holder for holding a liquid crystal display cell therewith, (b) a cell positioner for driving the cell holder in such a manner that a hole formed with the liquid crystal display cell for introducing liquid crystal into the liquid crystal display cell therethrough, is upwardly directed, (c) a resin applicator for applying a resin to the hole for filling up the hole with the resin, the resin being to be cured when ultraviolet ray is radiated thereto, (d) a location detector for detecting a location in the hole where the resin reaches, and (e) a ultraviolet ray radiator for radiating ultraviolet ray to the resin when the location detector detects that the resin reaches a predetermined location. The apparatus makes it possible to allow the resin to reach at a predetermined position in the hole, and automatically apply resin to the hole and cure the resin.

35 Claims, 13 Drawing Sheets

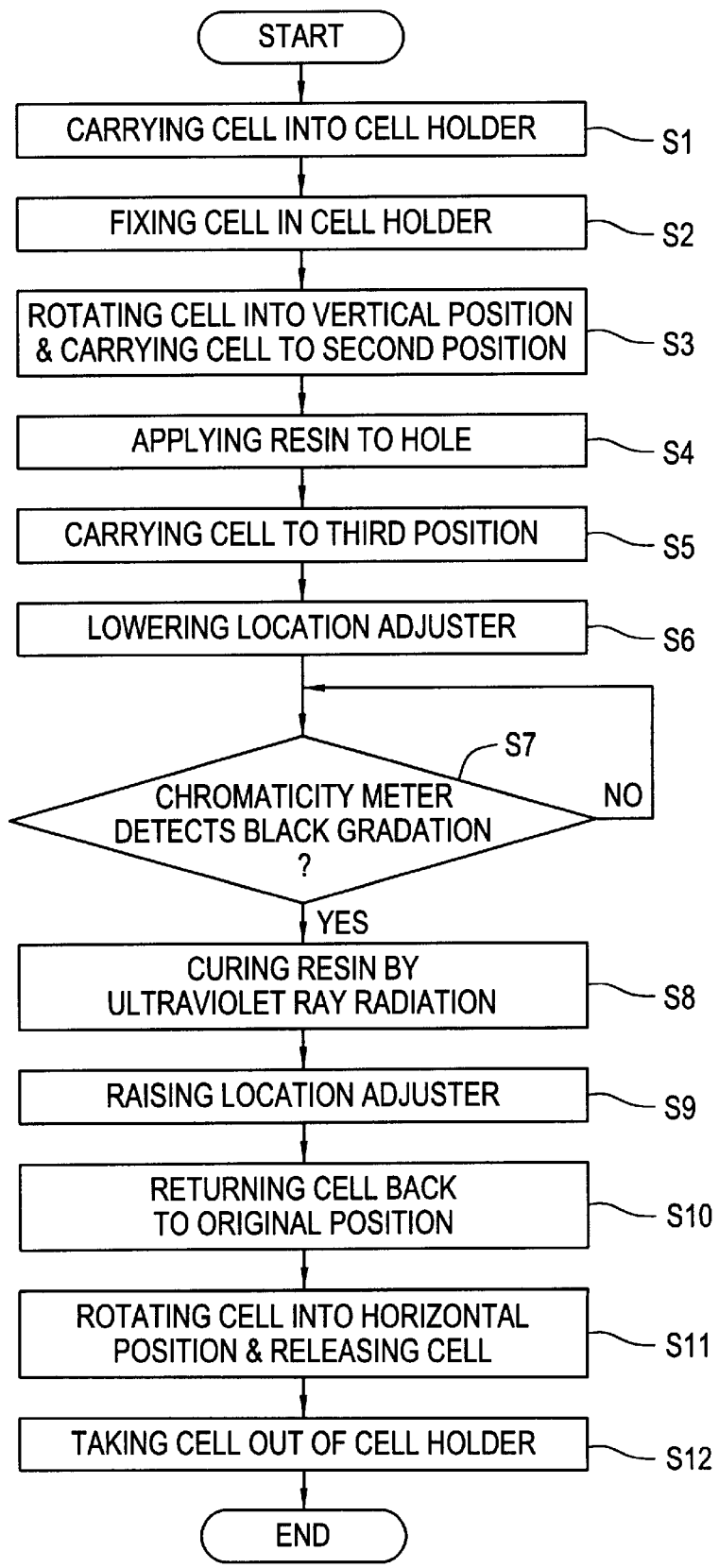

APPARATUS FOR FILLING UP A LIQUID CRYSTAL INJECTION HOLE IN A LCD CELL AND METHOD OF DOING THE SAME HAVING A DETECTOR OF RESIN LOCATION IN AN INJECTION HOLE

BACKGROUND OF THE INVENTION

1. Field of the Invention

The invention relates to an apparatus for filling a hole formed with a liquid crystal display cell and a method of doing the same, and more particularly to such an apparatus and a method both capable of making it possible to allowing a curable resin to reach at a predetermined position in the hole.

2. Description of the Related Art

FIG. 1 is an exploded perspective view of a liquid crystal display cell. A liquid crystal display cell 100 used for a thin film transistor (TFT) active matrix type color liquid crystal panel is generally comprised of a thin film transistor substrate (hereinafter, referred to as "TFT substrate") 101 and a color filter substrate (hereinafter, referred to as "CF substrate") 102. These TFT substrate 101 and the CF substrate 102 are adhered to each other with a small gap therebetween so that the adhered substrates 101 and 102 make a hollow space therein and the hollow space is communicated to atmosphere through an injection hole 104. Liquid crystal is injected into the hollow space through the injection hole 104. Thus, the liquid crystal display cell 100 is completed.

TFT substrate 101 is designed to have an alignment film on a surface on which TFT has been fabricated. An adhesive 103 which is to be cured when heated is applied to a region outside a display region 105 of the surface of TFT substrate 101. Then, TFT substrate 101 and CF substrate 102 are overlapped with spacers 106 being sandwiched therebetween. TFT substrate 101 and CF substrate 102 are adhered to each other by heating and pressurizing them to thereby bake the adhesive 103.

In order to inject liquid crystal into a space formed between TFT substrate 101 and CF substrate 102, when the adhesive 103 is applied to a region outside the display region 105, there is formed an injection hole 104 through which liquid crystal is to be injected into the above-mentioned space.

Liquid crystal is injected into the space as follows. First, the liquid crystal display cell 100 is put into vacuum atmosphere. Then, as illustrated in FIG. 2, the liquid crystal display cell 100 is downwardly moved in a direction indicated with an arrow so that the injection hole 104 makes contact with liquid crystal 108 contained in a liquid crystal plate 107. Then, the vacuum atmosphere around the liquid crystal display cell 100 is turned into atmospheric pressure. As a result, the liquid crystal 108 is absorbed into the space due to a difference in pressure between inside and outside the liquid crystal display cell 100.

After the liquid crystal 108 has been introduced into the space, the injection hole 104 is closed by means of a resin which is cured when ultraviolet ray is radiated thereto. After the injection hole 104 has been filled with the resin and the resin has been applied around the hole 104, the resin is cured by radiating ultraviolet ray thereto from a ultraviolet lamp standing in a predetermined position.

However, as illustrated in FIGS. 3A and 3B, a gap β of the injection hole 104 through which the liquid crystal 108 is introduced into the space may be expanded greater than a gap defined by the spacers 106, or may be not uniform in liquid crystal display cells. Thus, there may be caused a problem that the resin 109 to be cured when ultraviolet ray is radiated thereto unpreferably enters the display region 105 of the liquid crystal display cell 100, resulting in defectiveness in display in the liquid crystal display cell 100.

In addition, there may be caused another problem that a distance α by which the resin 109 enters the injection hole 104 is not uniform in liquid crystal display cells, resulting in deterioration in a fabrication yield.

For instance, Japanese Unexamined Patent Publication No. 8-160440 (hereinafter, referred to as "first prior art") has suggested a liquid crystal display cell capable of overcoming the above-mentioned problems. FIG. 4A is a perspective view illustrating a liquid tight container suggested in the first prior art, and FIG. 4B is a cross-sectional view illustrating a resin is being introduced into the liquid tight container.

As illustrated in FIG. 4A, a container 200 is comprised of first and second glass substrates 201 and 202 adhered to each other with a sealing frame 203 being sandwiched therebetween. The sealing frame 203 is formed with a tunnel-like gap 204 through which liquid crystal is introduced into the container 200.

In order to seal the gap 204, the gap 204 is first dipped into a resin pool 231. As a result, as illustrated in FIG. 4B, the resin 231 is upwardly absorbed in the gap 204 in a direction indicated with arrows, and further enters the sealing frame 203 from a position C to a position H.

While the resin 231 is being absorbed in the gap 241, a light is radiated to at least a top H of the resin 231 to thereby cure the resin 231 in the gap 204.

In accordance with the first prior art, it would be possible to cure a top of the resin 231 in the desired form by pattering a light to be radiated to the resin 231 to cure the resin 231, and to prevent the resin 231 to further enter the container 200 beyond the top H thereof.

Japanese Unexamined Patent Publication No. 6-160873 (hereinafter, referred to as "second prior art") has suggested a method and an apparatus for closing a hole through which liquid crystal has been introduced into a liquid crystal display panel, with a resin which is to be cured when ultraviolet ray is radiated thereto. FIG. 5 is a side view of an apparatus for closing the hole, suggested in the second prior art.

As illustrated in FIG. 5, a plurality of liquid crystal display panels are fixed by a jig 302 on a carrier plate 303 so that a hole through which liquid crystal is introduced into a liquid crystal display panel is upwardly directed. An applicator base 305 on which an automatic applicator 304 and a driver therefor are mounted receives a rotational force 306 generated by a motor 306, transmitted through a ball screw 307, and moves in a direction indicated with an arrow A.

When a jig sensor detects the jig 302, the applicator base 305 is caused to stop. Then, the automatic applicator 304 moves to a predetermined position, and successively applies a resin to the liquid crystal display panels. Herein, the applied resin is a resin which is cured when ultraviolet ray is radiated thereto.

After the application of the resin to the liquid crystal display panels has been finished, the carrier plate 303 on which the jig 302 is mounted is guided by a linear guide bearing 320 and moved in a direction indicated with an arrow B by a rotational force of a motor 318, transferred through a ball screw 319.

When a jig sensor 321 detects the jig 302, the carrier plate 303 is caused to stop. After the carrier plate 303 has been caused to stop, a cylinder 324 moves in the left to thereby open a shutter 323 of an ultraviolet ray lamp 322 for a certain period of time. Thus, the ultraviolet ray lamp 322 radiates ultraviolet ray to the resin having been applied to the liquid crystal display panels.

After ultraviolet ray has been radiated to the resin having been applied to all the liquid crystal display panels mounted on the jig 302, the carrier plate 303 returns to its original position. Thus, a cycle of an operation for closing the hole finishes.

In the above-mentioned first prior art, a resin for sealing the hole 204 can be cured at a desired position in the hole 204 by always radiating a light to the desired position.

However, the first prior art is accompanied with a problem that since a light is radiated through the glass substrate 201 or 202, a light is decayed, resulting in that the resin 231 enters the container 200 beyond a desired position to which a light is always radiated, without being cured.

The first prior art is accompanied with another problem that since a light is radiated through the glass substrate 201 or 202, a light is decayed, resulting in that a curing rate of the resin 231 is reduced. As a result, an accelerating agent contained in the resin 231 for accelerating the resin 231 to cure leaks into liquid crystal, which would bring defectiveness in display in the liquid crystal display.

In accordance with the above-mentioned second prior art, a resin to be cured when ultraviolet ray is radiated thereto is automatically applied to a hole through which liquid crystal has been introduced into the liquid crystal display panel. Hence, it is possible to keep amount and length of an applied resin constant. In addition, since the resin is cured under control for a total amount of ultraviolet ray, it would be possible to stably, successively cure the resin.

However, the second prior art does not have a controller for controlling a distance by which the resin reaches in the hole of the liquid crystal display panel. As a result, the second prior art is accompanied with such a problem as having been explained with reference to FIGS. 3A and 3B.

SUMMARY OF THE INVENTION

In view of the above-mentioned problems of the prior art, it is an object of the present invention to provide an apparatus and a method both of which are capable of automatically applying and curing a resin, and controlling a distance by which a resin reaches in a hole of a liquid crystal display.

In one aspect, there is provided an apparatus for filling up a hole formed with a liquid crystal display cell for introducing liquid crystal into the liquid crystal display cell therethrough, including (a) a resin applicator for applying a resin to a hole formed with a liquid crystal display cell for introducing liquid crystal into the liquid crystal display cell therethrough, for filling up the hole with the resin, the resin being to be cured when ultraviolet ray is radiated thereto, (b) a location detector for detecting a location in the hole where the resin reaches, and (c) a ultraviolet ray radiator for radiating ultraviolet ray to the resin when the location detector detects that the resin reaches a predetermined location.

For instance, the location detector may be comprised of a light source, and a chromaticity meter receiving a light emitted from the light source, the location detector detecting a location where the resin reaches, by virtue of variation in chromaticity, detected by the chromaticity meter.

It is preferable that the apparatus further includes a first polarizing plate fixed to the light source at a surface thereof, and a second polarizing plate fixed to the chromaticity meter at a surface thereof so that the first and second polarizing plates face to each other.

It is preferable that the apparatus further includes (d) a mover for moving the liquid crystal display cell to a first position where the resin is applied to the hole of the liquid crystal display, and a second position where the ultraviolet ray radiator radiates ultraviolet ray to the resin, (e) a cell location detector for detecting that the liquid crystal display cell is located at the first or second position, and (f) a controller for stopping the mover to operate when the cell location detector detects that the liquid crystal display cell is located at the first or second position.

It is preferable that the resin applicator is designed to be upwardly and downwardly movable. It is also preferable that the location detector and/or the ultraviolet ray radiator are(is) designed to be upwardly and downwardly movable.

It is preferable that the apparatus further include a connector for connecting the location detector to the ultraviolet ray radiator so that the location detector and the ultraviolet ray radiator are movable together.

There is further provided an apparatus for filling up a hole formed with a liquid crystal display cell for introducing liquid crystal into the liquid crystal display cell therethrough, including (a) a cell holder for holding a liquid crystal display cell therewith, (b) a cell positioner for driving the cell holder in such a manner that a hole formed with the liquid crystal display cell for introducing liquid crystal into the liquid crystal display cell therethrough, is upwardly directed, (c) a resin applicator for applying a resin to the hole for filling up the hole with the resin, the resin being to be cured when ultraviolet ray is radiated thereto, (d) a location detector for detecting a location in the hole where the resin reaches, and (e) a ultraviolet ray radiator for radiating ultraviolet ray to the resin when the location detector detects that the resin reaches a predetermined location.

It is preferable that the cell positioner rotates the cell holder into a first position where the liquid crystal display cell horizontally lies, and a second position where the liquid crystal display cell vertically stands and the hole is upwardly directed.

For instance, the cell positioner may be comprised of a first cylinder rotatably connected to a bottom surface of the cell holder, and a second cylinder rotatably connected to a side surface of the cell holder.

There is still further provided an apparatus for filling up a hole formed with a liquid crystal display cell for introducing liquid crystal into the liquid crystal display cell therethrough, including (a) a cell holder for holding at least two liquid crystal display cells therewith, (b) a cell positioner for driving the cell holder in such a manner that holes formed with the liquid crystal display cells for introducing liquid crystal into the liquid crystal display cells therethrough, are upwardly directed, (c) a resin applicator for applying a resin to the holes for filling up the holes with the resin, the resin being to be cured when ultraviolet ray is radiated thereto, (d) location detectors in the same number as that of the liquid crystal display cells for detecting a location in each of the holes where the resin reaches, and (e) ultraviolet ray radiators in the same number as that of the liquid crystal display cells for radiating ultraviolet ray to the resin when the location detectors detect that the resin reaches a predetermined location, one of the location detectors and one of the ultraviolet ray radiators being associated with one of the liquid crystal display cells.

For instance, the liquid crystal display cells are sandwiched in the cell holder with a spacer therebetween.

There is yet further provided an apparatus for filling up a hole formed with a liquid crystal display cell for introducing liquid crystal into the liquid crystal display cell therethrough, including (a) a cell holder for holding at least two liquid crystal display cells therewith, (b) a cell positioner for driving the cell holder in such a manner that holes formed with the liquid crystal display cells for introducing liquid crystal into the liquid crystal display cells therethrough, are upwardly directed, (c) resin applicators in the same number as that of the liquid crystal display cells for applying a resin to an associated one of the holes for filling up the associated one of the holes with the resin, the resin being to be cured when ultraviolet ray is radiated thereto, (d) location detectors in the same number as that of the liquid crystal display cells for detecting a location in each of the holes where the resin reaches, and (e) ultraviolet ray radiators in the same number as that of the liquid crystal display cells for radiating ultraviolet ray to the resin when the location detectors detect that the resin reaches a predetermined location, one of the location detectors and one of the ultraviolet ray radiators being associated with one of the liquid crystal display cells.

In another aspect of the present invention, there is provided a method of filling up a hole formed with a liquid crystal display cell for introducing liquid crystal into the liquid crystal display cell therethrough, including the steps, in sequence, of (a) holding a liquid crystal display cell formed with a hole for introducing liquid crystal into the liquid crystal display cell therethrough, (b) directing the hole upwardly, (c) applying a resin to the hole, the resin being to be cured when ultraviolet ray is radiated thereto, (d) detecting a location where the resin reaches in the hole, and (e) radiating ultraviolet ray to the resin when the resin is detected to reach a predetermined position in the hole.

For instance, the location may be detected in the step (d) by monitoring variation in chromaticity of a light passing through the predetermined position.

There is further provided a method of filling up a hole formed with a liquid crystal display cell for introducing liquid crystal into the liquid crystal display cell therethrough, including the steps, in sequence, of (a) holding liquid crystal display cells each of which is formed with a hole for introducing liquid crystal into each of the liquid crystal display cell therethrough, (b) directing each of the holes upwardly, (c) applying a resin to each of the holes concurrently or in turn, the resin being to be cured when ultraviolet ray is radiated thereto, (d) detecting a location where the resin reaches in each of the holes, and (e) radiating ultraviolet ray to the resin when the resin is detected to reach a predetermined position in each of the holes.

In accordance with the present invention, it is possible to adjust a location where a resin reaches in a hole in a liquid crystal display cell. Hence, even when an opening of the hole is expanded, it would be possible to prevent the resin from entering a display region of a liquid crystal display cell. As a result, there can be obtained a liquid crystal display cell with high reliability and high performance.

In addition, the present invention uniformizes a location where a resin reaches in a hole in a liquid crystal display cell, which would ensure a higher yield of fabrication and higher productivity.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 12 is a flow chart showing steps in the method in accordance with the present invention.

DESCRIPTION OF THE PREFERRED EMBODIMENTS

Figure 6:
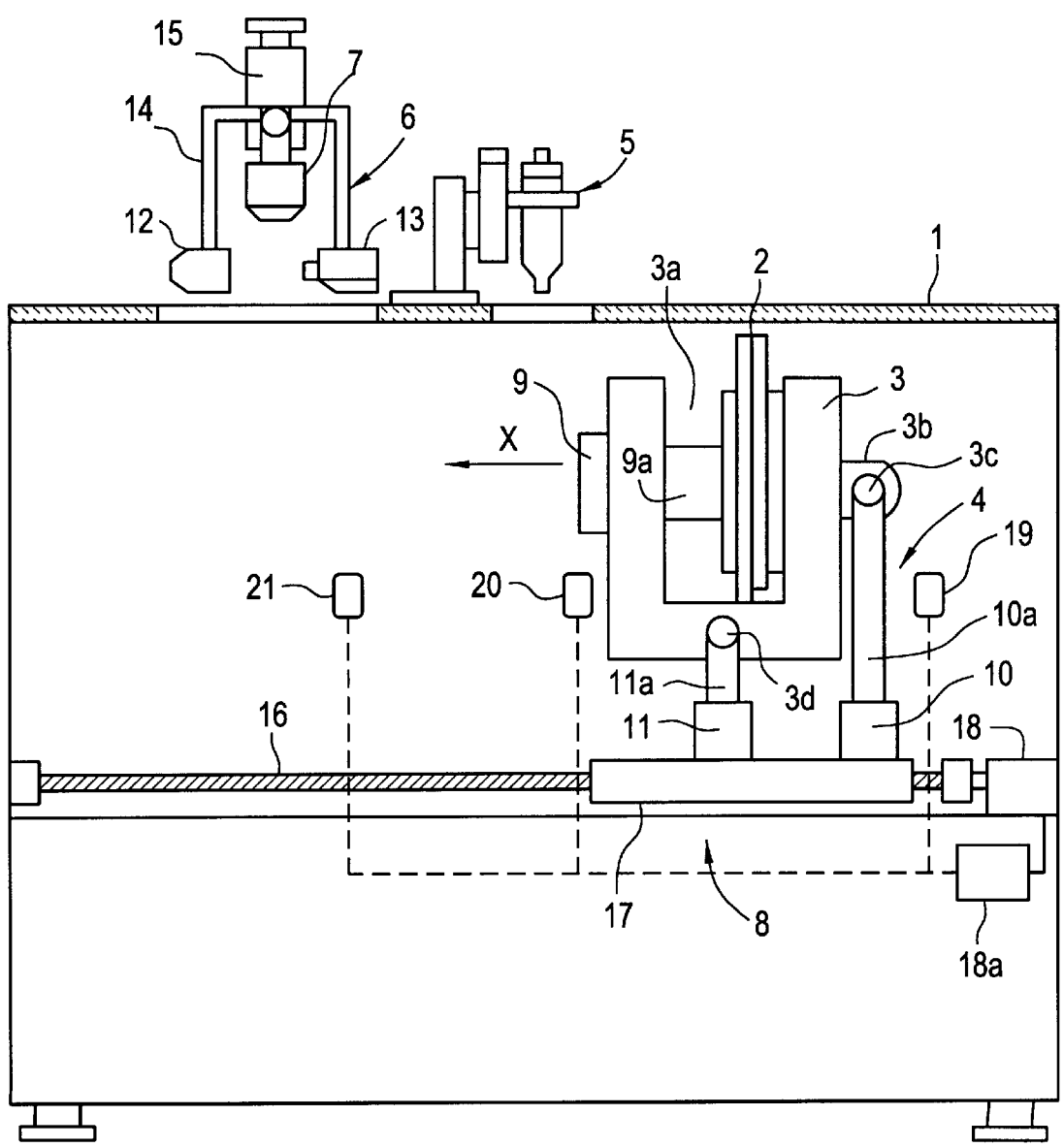
FIG. 6 is a front view illustrating an apparatus for sealing a hole of a liquid crystal display cell, in accordance with the first embodiment of the present invention.

FIG. 6 illustrates an apparatus for filling up a hole formed with a liquid crystal display cell for introducing liquid crystal into the liquid crystal display cell therethrough, in accordance with the first embodiment of the present invention.

Figure 7:
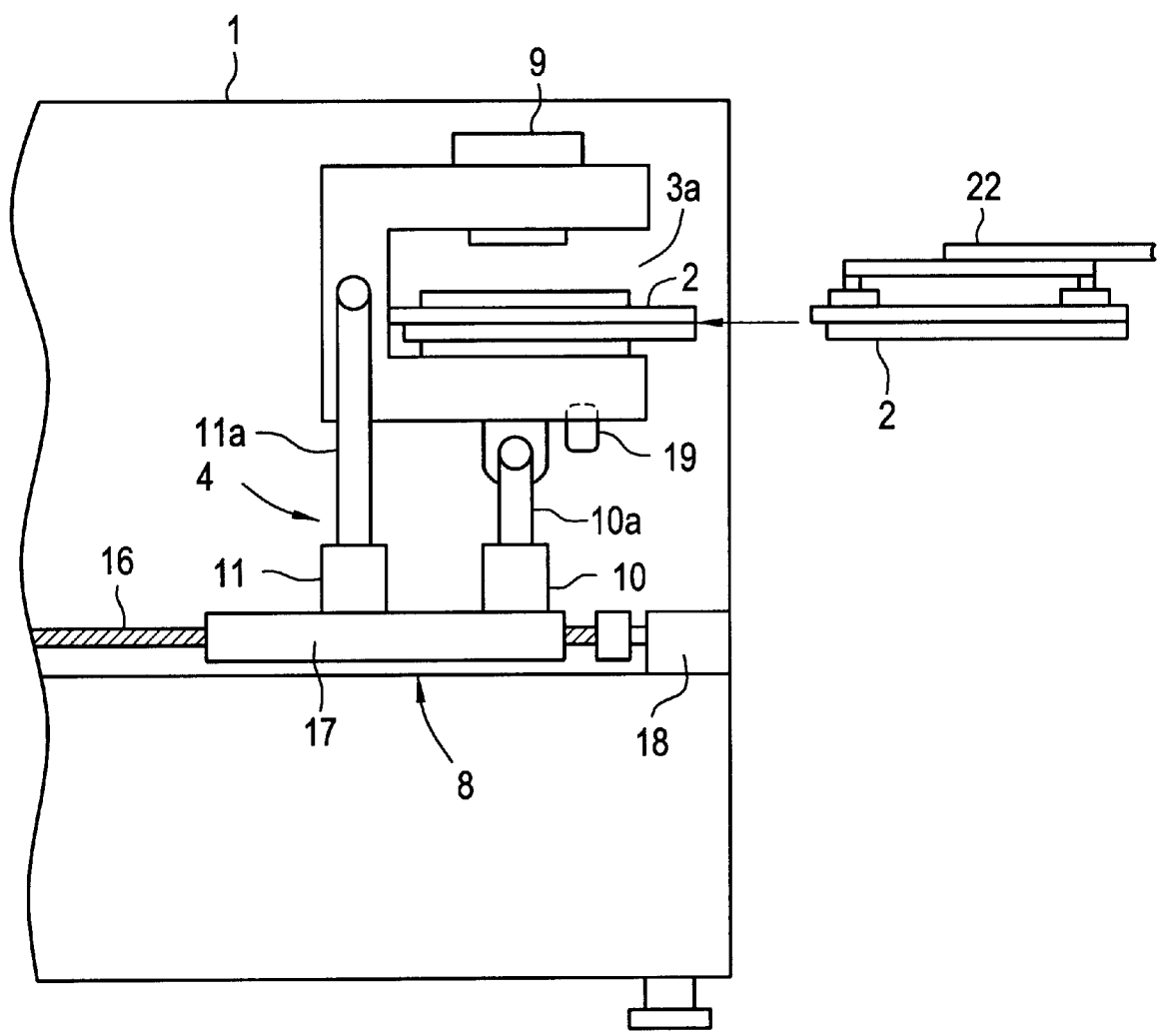
FIG. 7 is a front view illustrating that a liquid crystal display cell is carried into the apparatus illustrated in FIG. 6.

As illustrated in FIG. 6, the apparatus is comprised of an enclosure 1, a cell holder 3 positioned in the enclosure 1 for holding a liquid crystal display cell 2 therewith, a cell positioner 4 for rotating the cell holder 3 to such a horizontal position as illustrated in FIG. 7 where the liquid crystal display cell 2 is carried into the apparatus, and to such a vertical position where a hole formed with the liquid crystal display cell 2 for introducing liquid crystal into the liquid crystal display cell 2 therethrough, is upwardly directed, a resin applicator 5 for applying a resin across the hole for filling up the hole with the resin, a location detector 6 for detecting a location in the hole where the resin reaches, a ultraviolet ray radiator 7 for radiating ultraviolet ray to the resin having been applied across the hole, when the location detector 6 detects that the resin reaches a predetermined location in the hole, and a cell mover 8 for moving the cell holder 3 to a first position where the resin is applied across the hole of the liquid crystal display cell, and a second position where the ultraviolet ray radiator 7 radiates ultraviolet ray to the resin.

In the description of the embodiments, unless otherwise indicated, the term "resin" means a resin which is to be cured when ultraviolet ray is radiated thereto.

The cell holder 3 is almost U-shaped, and has an opening 3a through which the liquid crystal display cell 2 is introduced into the cell holder 3. The cell holder 3 is equipped with a cell fixer 9 for fixing the liquid crystal display cell 2 in the cell holder 3. In the first embodiment, the cell fixer 9 is comprised of a cylinder extendable from one side to the other side of the cell holder 3.

The cell positioner 4 is comprised of first and second extendable and contractible cylinders 10 and 11. The first cylinder 10 includes a rod 10a which is rotatably connected at a tip end thereof to a bracket 3b formed on a side surface of the cell holder 3, via a pin 3c, and the second cylinder 11 includes a rod 11a which is rotatably connected at a tip end thereof to a base portion of the cell holder 3 via a pin 3d. When the rods 10a and 11a of the first and second cylinders 10 and 11 extend or contract, the cell holder 3 rotates accordingly.

The resin applicator 5 is supported above an upper surface of the enclosure 1, and applies a certain amount of resin across a hole formed with the liquid crystal display cell 2. The resin applicator 5 is designed to upwardly and downwardly move. When the resin applicator 5 applies a resin to the liquid crystal display cell 2, the resin applicator 5 lowers below an upper surface of the enclosure 1, and approaches a hole of the liquid crystal display cell 2.

The location detector 6 is comprised of a light source 12 and a chromaticity meter 13 receiving a light transmitted from the light source 12. The location detector 6 detects a location where the resin enters in the hole of the liquid crystal display cell 2 by virtue of variation in chromaticity, detected by the chromaticity meter 13. The light source 12 and the chromaticity meter 13 are spaced away from each other by a certain distance, and the hole of the liquid crystal display cell 2 is positioned so as to be located between the light source 12 and the chromaticity meter 13. The light source 12 emits a light having the same wavelength as a wavelength of a back light used in a liquid crystal display including the liquid crystal display cell 2. The chromaticity meter 13 has a spot diameter of about 0.5 mm.

Figure 10:
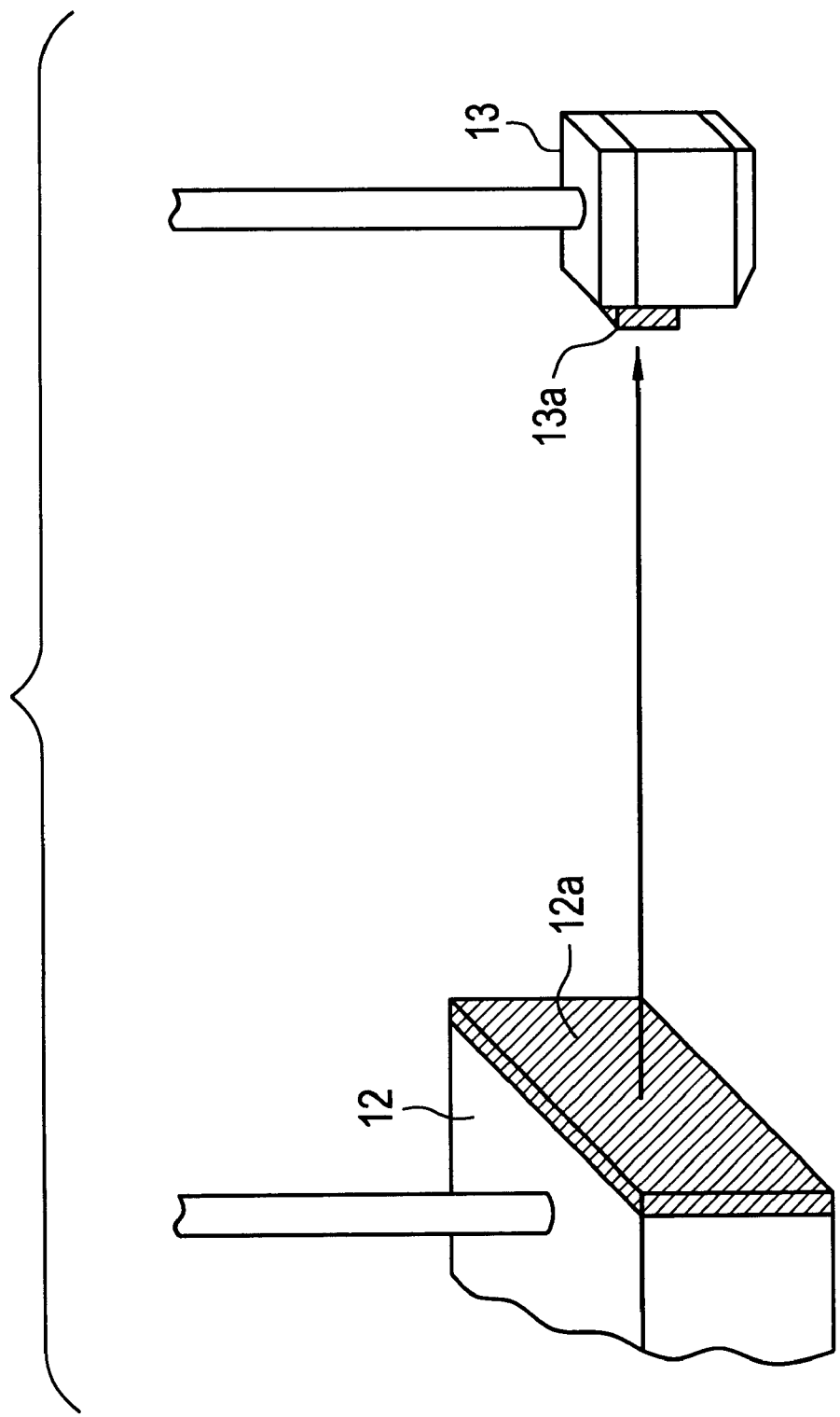
FIG. 10 is a perspective view illustrating a light source and a chromaticity meter.

As illustrated in FIG. 10, the light source 12 and the chromaticity meter 13 has polarizing plates 12a and 13a adhered to surfaces thereof so that the polarizing plates 12a and 13a face with each other. Thus, the liquid crystal display cell 2 is positioned intermediate between the light source 12 and the chromaticity meter 13 in cross-nicol condition. The polarizing plate 13a adhered to a surface of the chromaticity meter 13 is designed to have a polarizing axis extending in an alignment direction of liquid crystal, and the polarizing plate 12a adhered to a surface of the light source 12 is designed to have a polarizing axis forming 90 degrees relative to the alignment direction of the polarizing axis of the polarizing plate 13a.

The ultraviolet ray radiator 7 is comprised of an ultraviolet ray lamp, and is positioned slightly above the midpoint between the light source 12 and the chromaticity meter 13. The ultraviolet ray radiator 7 receives a signal from the location detector 6, and radiates ultraviolet ray on receiving a signal indicating that a resin enters a hole of the liquid crystal display cell 2 by a predetermined distance. The ultraviolet ray radiator 7 radiates ultraviolet ray having an intensity of about 3000 mj/cm$^2$.

When the ultraviolet ray radiator 7 radiates ultraviolet ray, for instance, the ultraviolet ray radiator 7 is located above the liquid crystal display cell 2 by a distance of 20±1 mm, the chromaticity meter 13 and the light source 12 are located above the liquid crystal display cell 2 by a distance of about 5 mm, and the light source 12 emits a light at a distance of about 2 mm from the hole towards a display region of the liquid crystal display cell 2.

The location detector 6 and the ultraviolet ray radiator 7 are connected to each other through a connector 14 so that they can move upwardly and downwardly together. The connector 14 is fixed to a location adjuster 15 movable upwardly and downwardly. The location adjuster 15 is comprised of, for instance, a ball screw and a step motor, and positions the ultraviolet ray radiator 7 at a predetermined position. The location adjuster 15 can raise or lower the ultraviolet ray radiator 7 by 0.1 millimeters in order to obtain a desired total amount of emission.

The location detector 6 and the ultraviolet ray radiator 7 may be designed to be movable independently of each other. Similarly, the light source 12 and the chromaticity meter 13 may be designed to be movable independently of each other.

The cell mover 8 is comprised of a horizontally extending ball screw 16, a base 17 which horizontally carries the cell holder 3 by virtue of a rotational force of the ball screw 16, and a drive motor 18 for rotating the ball screw 16 around a rotational axis of the ball screw 16. The first and second cylinders 10 and 11 are fixed on the base 17.

The apparatus illustrated in FIG. 6 further includes a first sensor 19 for detecting that the liquid crystal display cell 2 carried at the cell holder 3 is located at a first position or a start position from which the cell holder 3 starts to horizontally move, a second sensor 20 for detecting that the liquid crystal display cell 2 is located at a second position where a resin is to be applied across the hole of the liquid crystal display cell 2, and a third sensor 21 for detecting that the liquid crystal display cell 2 is located at a third position where the ultraviolet ray radiator 7 is to radiate ultraviolet ray to the resin.

The first, second and third sensors 19, 20, and 21 are all electrically connected to a controller 18a which controls an operation of a drive motor 18. The controller 18a receives detection signals from the first, second, and third sensors 19, 20, and 21, and stops the cell holder 3 at a desired position, based on the received detection signals.

An operation of the apparatus illustrated in FIG. 6 and having the above-mentioned structure is explained hereinbelow with reference to FIG. 12.

First, as illustrated in FIG. 7, the liquid crystal display cell 2 in which liquid crystal has been already introduced is carries into the cell holder 3 by means of a cell carrier 22 including an absorber, in step 1. At this stage, the rod 10a of the first cylinder 10 is contracted, and the rod 11a of the second cylinder 11 is extended. Hence, the cell holder 3 is horizontally positioned so that the opening 3a is directed towards the liquid crystal display cell 2 carried by the cell carrier 22.

Then, the rod 9a of the cell fixer 9 is caused to extend to thereby fix the liquid crystal display cell 2 in the cell holder 3, in step 2.

Then, the rod 10a of the first cylinder 10 is extended, and the rod 11a of the second cylinder 11 is contracted, resulting in that the liquid crystal display cell 2 changes its position from a horizontal position as illustrated in FIG. 7 to a vertical position as illustrated in FIG. 6. In the vertical position, a hole formed with the liquid crystal display cell 2 is upwardly directed.

Then, the drive motor 18 for driving the cell mover 8 is driven to rotate the ball screw 16 to thereby horizontally transfer the base 17 in a direction indicated with an arrow X until the liquid crystal display cell 2 is located the second position where a resin is to be applied across the hole of the liquid crystal display cell 2, in step 3.

Then, when the second sensor 20 detects that the liquid crystal display cell 2 reaches the second position, the second sensor 20 transmits a detection signal to the controller 18a. On receipt of the detection signal from the second sensor 20, the controller 18a stops the drive motor 18 to rotate the ball screw 16. As a result, the cell holder 3 is caused to stop at the second position.

Figure 8:
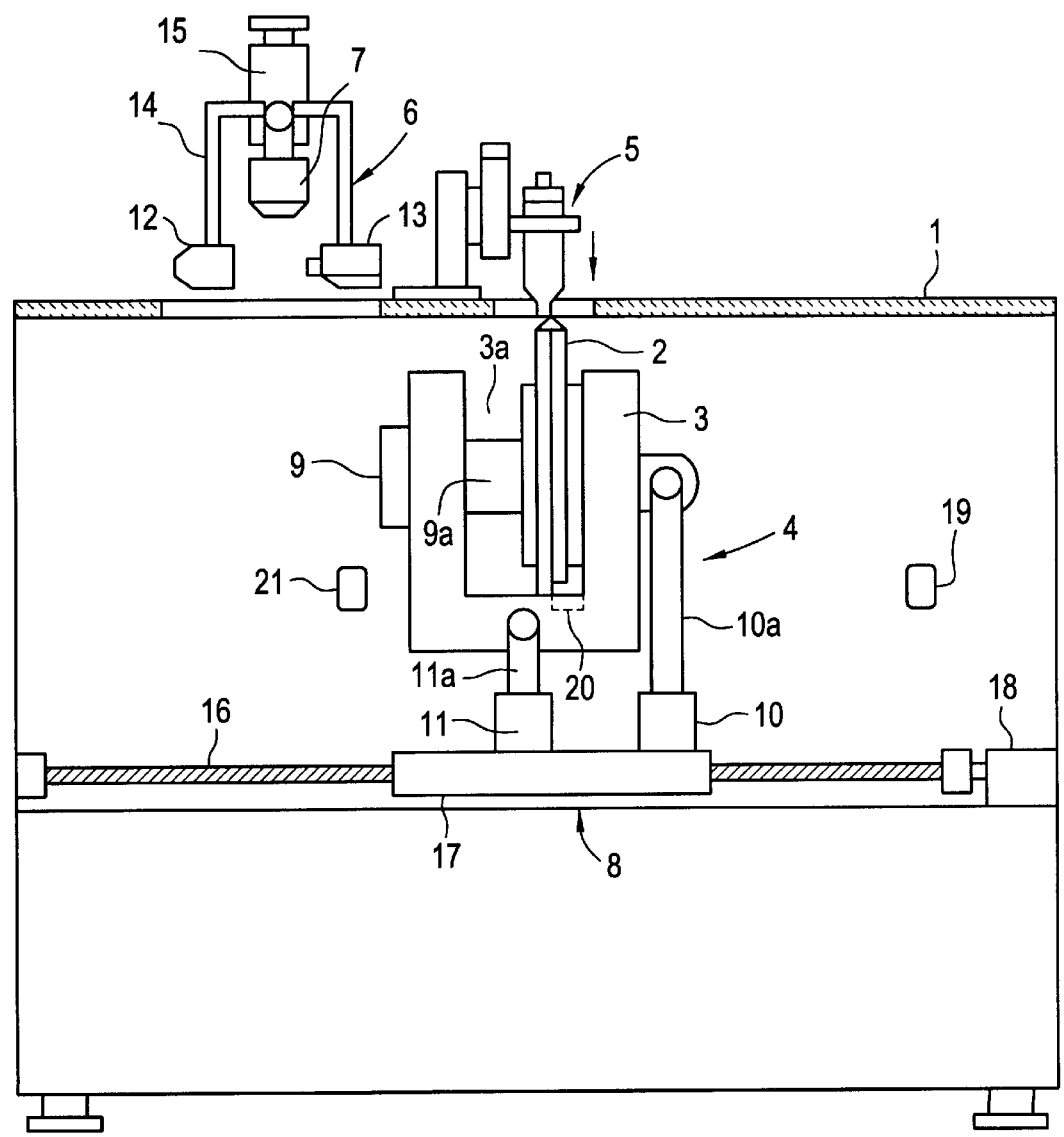
FIG. 8 is a front view of the apparatus illustrated in FIG. 6, illustrating that a resin is being applied across a hole of a liquid crystal display cell.

Then, as illustrated in FIG. 8, the resin applicator 5 moves downwardly and thereby approaches the hole of the liquid crystal display cell 2, and applies the resin across the hole in a certain amount, in step 4.

Then, the drive motor 18 is further driven to thereby horizontally transfer the base 17 until the liquid crystal display cell 2 reaches the third position where the ultraviolet ray radiator 7 is to radiate ultraviolet ray to the resin, in step 5.

When the third sensor 21 detects that the liquid crystal display cell 2 has reached the third position, the third sensor 21 transmits a detection signal to the controller 18a. On receipt of the detection signal from the third sensor 21, the controller 18a stops the drive motor 18 to rotate the ball screw 16. As a result, the cell holder 3 is caused to stop at the third position.

Figure 9:
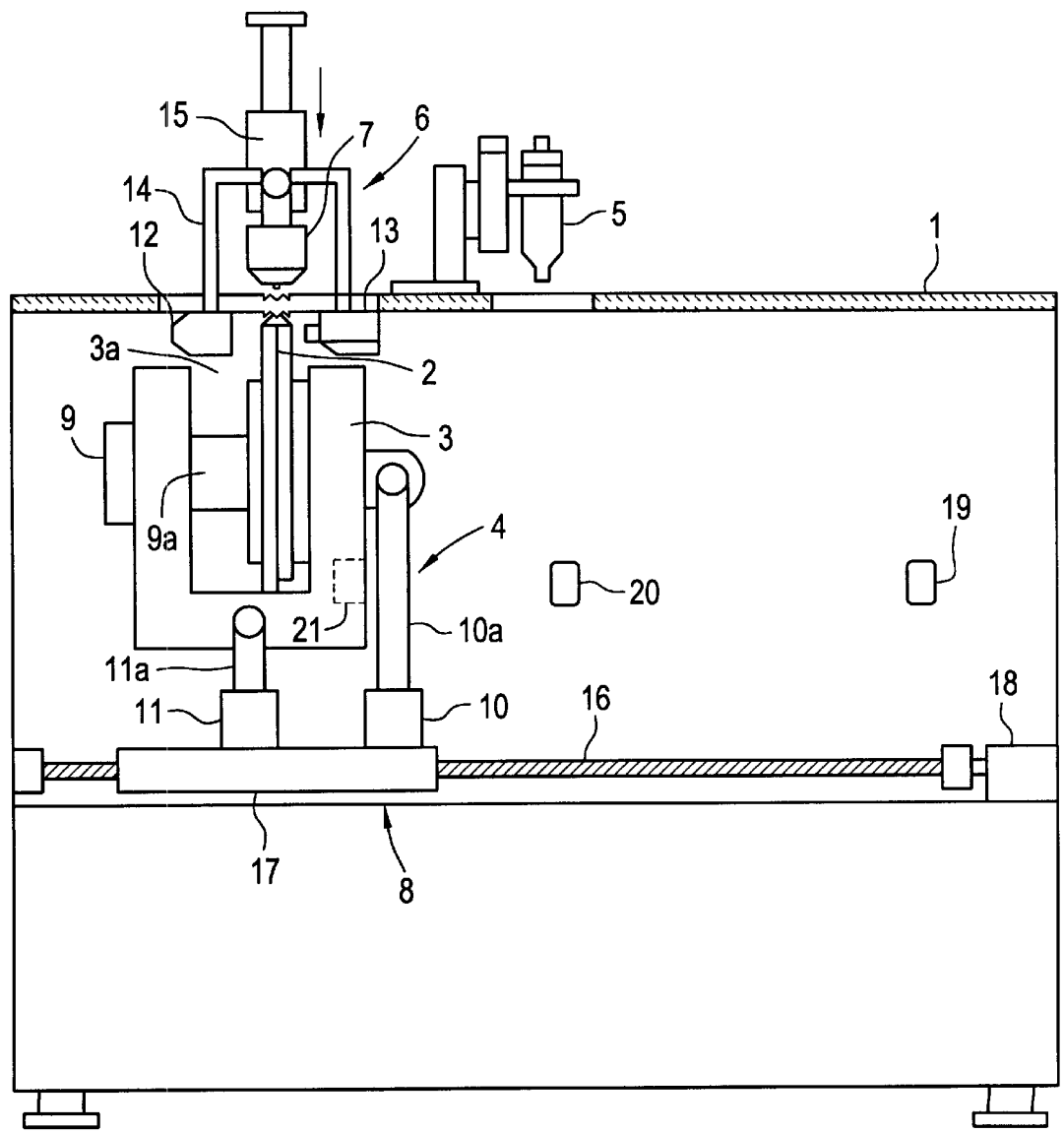
FIG. 9 is a front view of the apparatus illustrated in FIG. 6, illustrating that ultraviolet ray is being radiated to a resin having been applied across a hole of a liquid crystal display cell.

Then, as illustrated in FIG. 9, the location adjuster 15 lowers to thereby position the location detector 6 and the ultraviolet ray detector 7 relative to the liquid crystal display cell 2, in step 6.

Then, the chromaticity meter 13 receives a light transmitted from the light source 12, and detects a location where the resin has reached in the hole of the liquid crystal display cell 2, in accordance with detected variation in chromaticity. Specifically, the chromaticity meter 13 detects black gradation in step 7.

When the chromaticity meter 13 has detected black gradation, the ultraviolet ray radiator 7 is driven to radiate ultraviolet ray to and thereby cure the resin, in step 8.

When the ultraviolet ray radiator 7 has radiated ultraviolet ray to the resin in a predetermined total amount, the location adjuster 15 is caused to move upwardly, resulting in that the ultraviolet ray radiator 7 and the location detector 6 are also moved away from the liquid crystal display cell 2, in step 9.

Then, the controller 18a drives the drive motor 18 so that the ball screw 16 rotates in a counter direction, to thereby return the cell holder to its original position, that is, a position illustrated in FIG. 6, in step 10.

When the first sensor 19 detects that the liquid crystal display cell 2 has returned back to the first position, the first sensor 19 transmits a detection signal to the controller 18a. On receipt of the detection signal from the first sensor 19, the controller 18a stops the drive motor 18 to rotate the ball screw 16. As a result, the cell holder 3 is caused to stop at the first position.

Then, the rod 10a of the first cylinder 10 is contracted, and the rod 11a of the second cylinder 11 is extended. As a result, the cell holder 3 changes its position from the vertical position as illustrated in FIG. 6 to the horizontal position as illustrated in FIG. 7. Then, the rod 9a of the cell fixer 9 is contracted to thereby release the liquid crystal display cell 2 from being fixed in the cell holder 3, in step 11.

Finally, the cell carrier 22 takes the liquid crystal display cell 2 out of the cell holder 3, in step 12. Thus, a cycle of the operation of the apparatus in accordance with the first embodiment is completed.

Hereinbelow is explained how the location detector 6 detects a location in the hole where the resin reaches, with reference to FIGS. 11A to 11C.

Figure 11A:
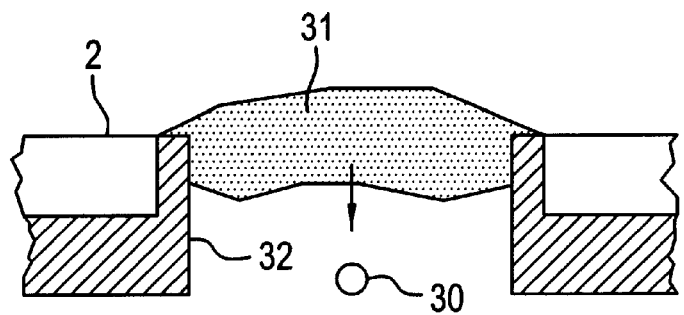
FIGS. 11A and 11B are front views each showing a positional relation between a resin and a path along which ultraviolet ray is radiated.
Figure 11B:
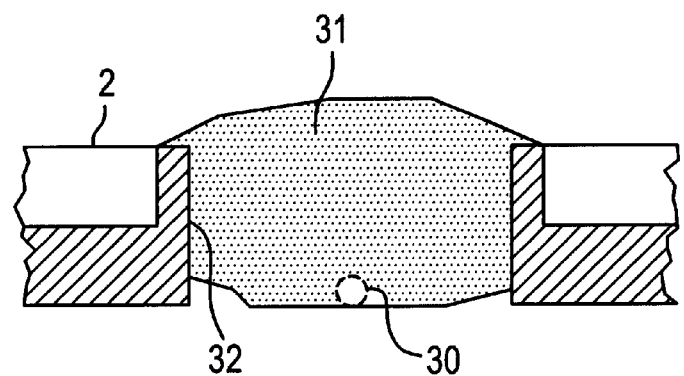
Figure 11C:
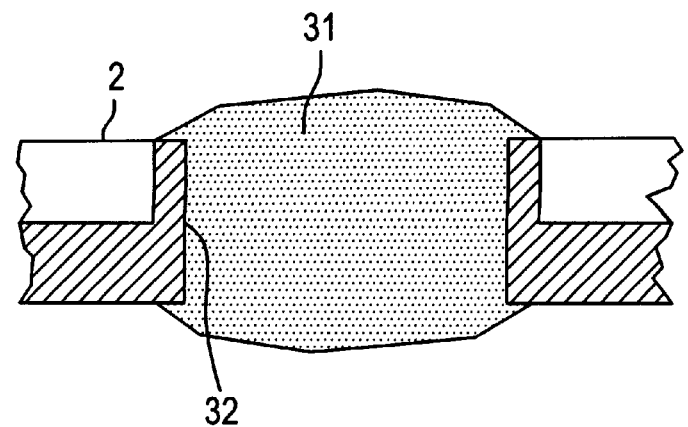
FIG. 11C is a front view illustrating a resin entering a hole in a prior liquid crystal display cell.

As illustrated in FIGS. 11A and 11B, the light source 12 emits a light in a hole 32 formed with the liquid crystal display cell 2 so that the light passes a point 30. The light emitted from the light source 12 is received by the chromaticity meter 13.

As illustrated in FIG. 11A, a resin 31 having been applied across the hole 32 of the liquid crystal display cell 2 gradually lowers in the hole 32 with the lapse of time in a direction indicated with an arrow.

Figure 1:
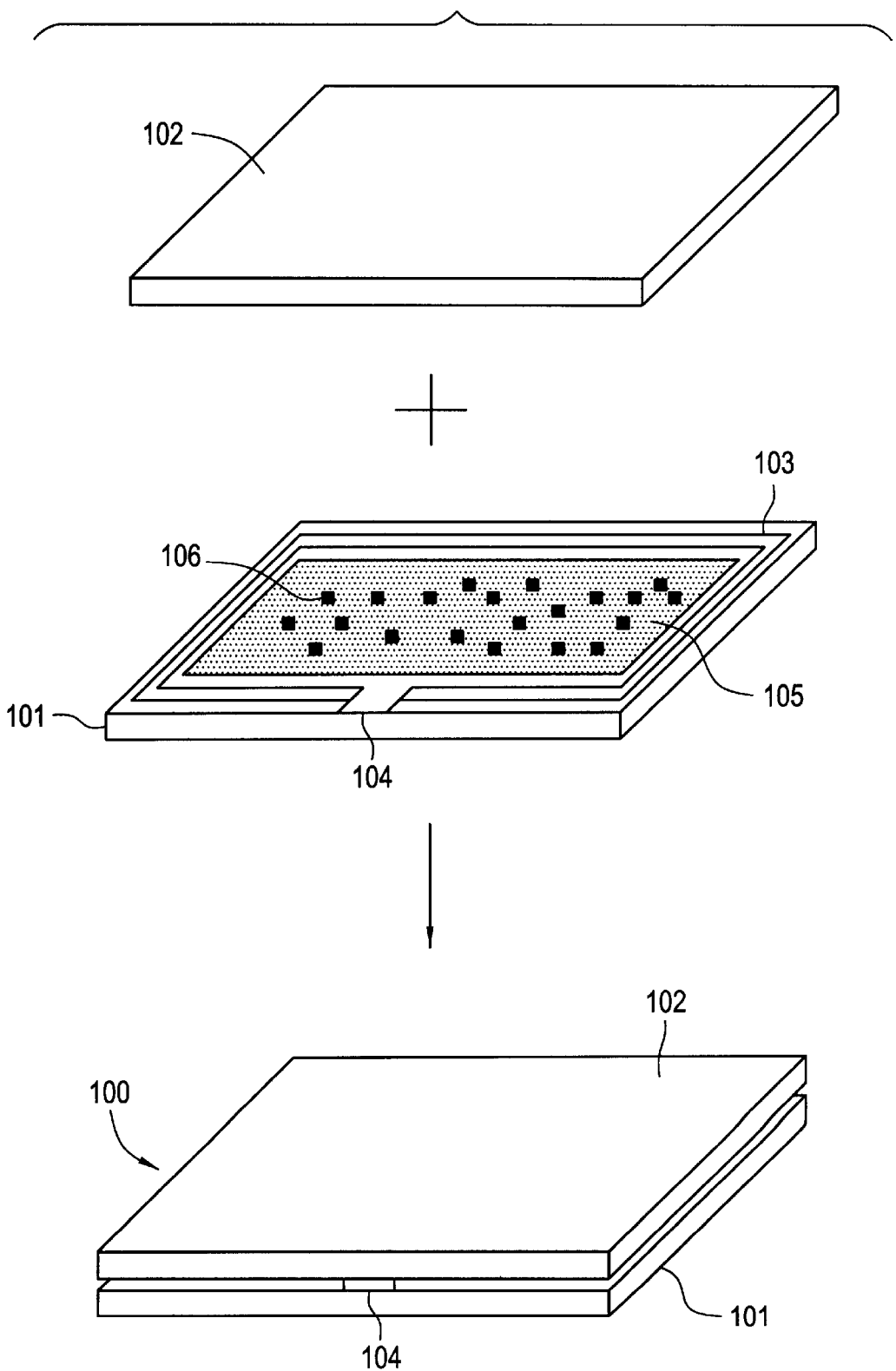
FIG. 1 is an exploded perspective view of a liquid crystal display cell.
Figure 2:
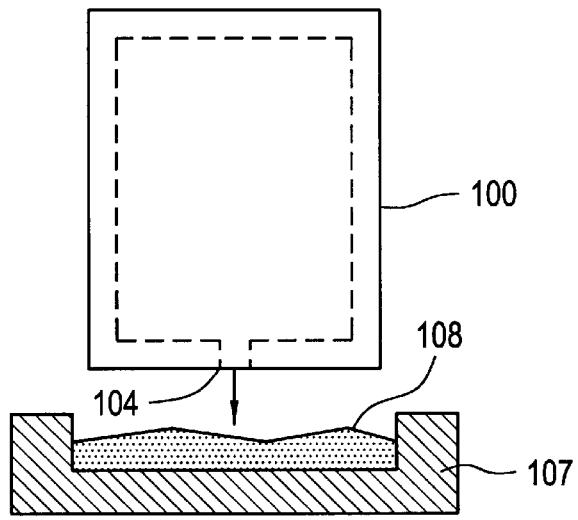
FIG. 2 is a view illustrating that a liquid crystal display cell is moved so that an injection hole of the cell makes contact with liquid crystal contained in a liquid crystal plate.
Figure 3A:
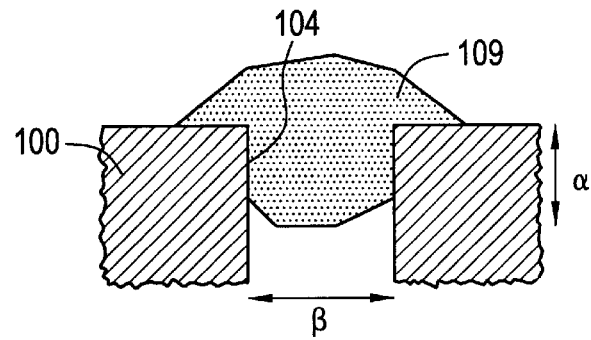
FIGS. 3A and 3B are cross-sectional views showing dispersion in a location where a resin reaches in an injection hole.
Figure 3B:
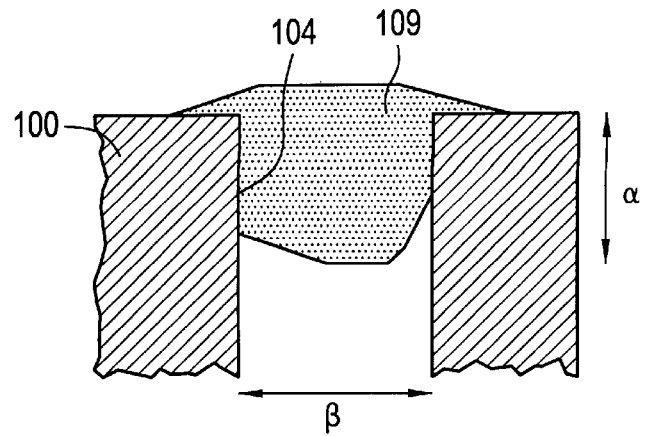
Figure 4A:
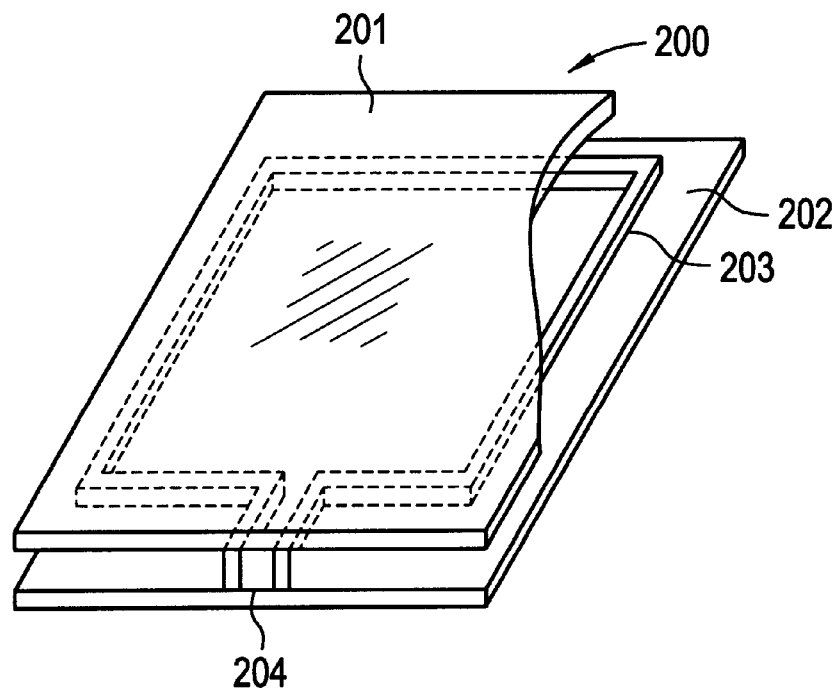
FIG. 4A is a perspective view illustrating a liquid tight container suggested in the first prior art.
Figure 4B:
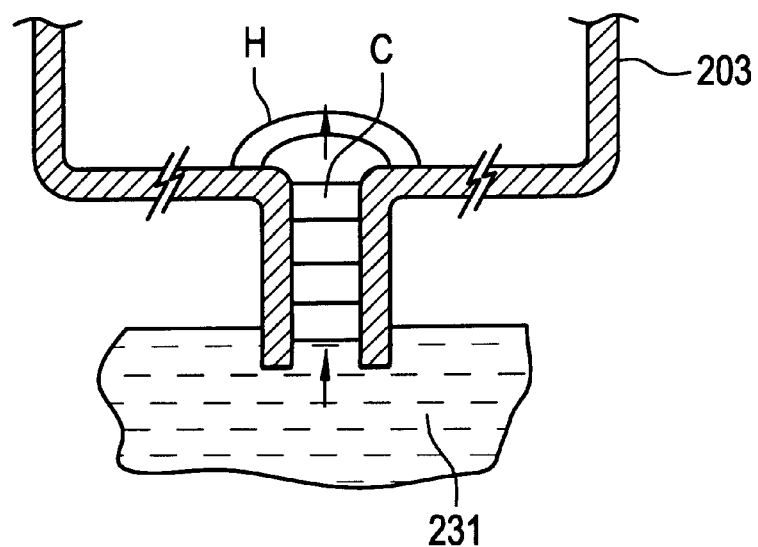
FIG. 4B is a cross-sectional view illustrating that a resin is absorbed into the container illustrated in FIG. 4A, through an injection hole.
Figure 5:
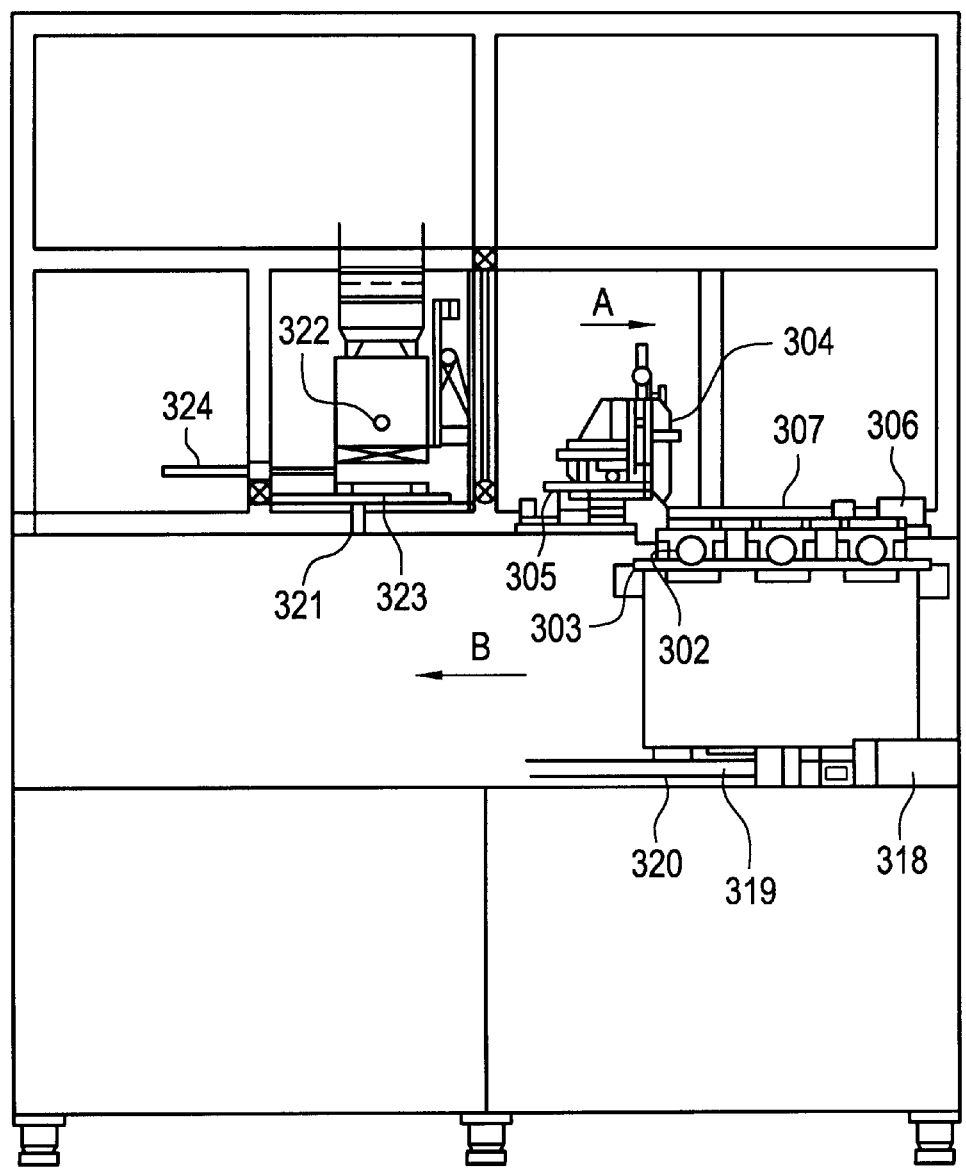
FIG. 5 is a side view illustrating an apparatus for sealing a hole of a liquid crystal display panel, suggested in the second prior art.

In the prior art, a location where the resin 31 has reached in the hole 32 was detected based on a period of time measured from the application of the resin 31 to the radiation of ultraviolet ray. Hence, if a width of the hole 32 was expanded greater than a width defined by the spacer 106 sandwiched between the substrates 101 and 102 (see FIG. 1), the resin 31 may unpreferably enter a display region of the liquid crystal display cell 2, as illustrated in FIG. 11C, resulting in display defectiveness in the liquid crystal display cell 2.

In addition, if there is dispersion in a width of the hole 32, a location where the resin 31 reaches is not uniformized, resulting in deterioration in a fabrication yield of a liquid crystal display.

On the other hand, in accordance with the present invention, when the resin 31 reaches a predetermined position in the hole 32, the chromaticity meter 13 detects that chromaticity has turned into black gradation. When the chromaticity meter 13 detects the variation in chromaticity, the ultraviolet ray radiator 7 is driven to thereby radiate ultraviolet ray to the resin 31.

Thus, the present invention makes it possible to control a location where the resin 31 can reach in the hole 32. Accordingly, even if a width of the hole 32 were expanded, it would be possible to prevent the resin 31 from entering a display region of the liquid crystal display cell 2. This ensures the liquid crystal display cell 2 to have higher reliability and higher performance.

Furthermore, it would be possible to uniformize a location where the resin 31 reaches in the hole 32 in each of the liquid crystal display cells, which ensures higher fabrication yield and higher productivity.

Figure 14:
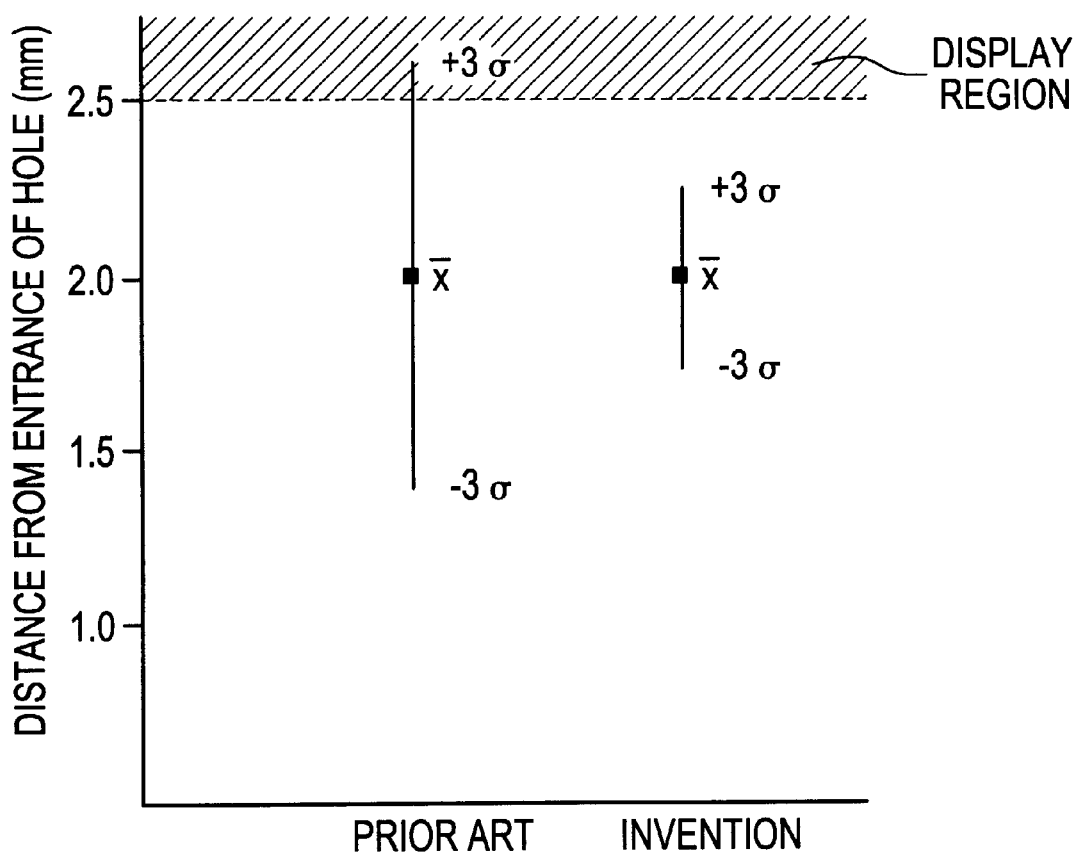
FIG. 14 is a graph showing dispersion in a location where a resin reaches in a hole both in a prior apparatus and in the apparatus in accordance with the present invention.

The inventor conducted the experiment for detecting a location where the resin 31 has reached in the hole 32 with respect to the liquid crystal display cell 2 in accordance with the above-mentioned embodiment and the prior liquid crystal display cell. The experiment was conducted for 20 points. FIG. 14 is a graph showing the results of the experiment in which a distance by which the resin 31 entered the hole 32 was attempted to be 2 mm. The average of the measurement results together with ±3 σ of the average are both shown in the graph.

The prior liquid crystal display cell had greater dispersion in a location where the resin 32 has reached in the hole 32. In some liquid crystal display cells, the resin 31 entered a display region of the liquid crystal display cell.

On the other hand, the liquid crystal display cell 2 in accordance with the embodiment had smaller dispersion in the location, and completely prevented the resin 31 to enter a display region of the liquid crystal display cell 2.

Figure 13:
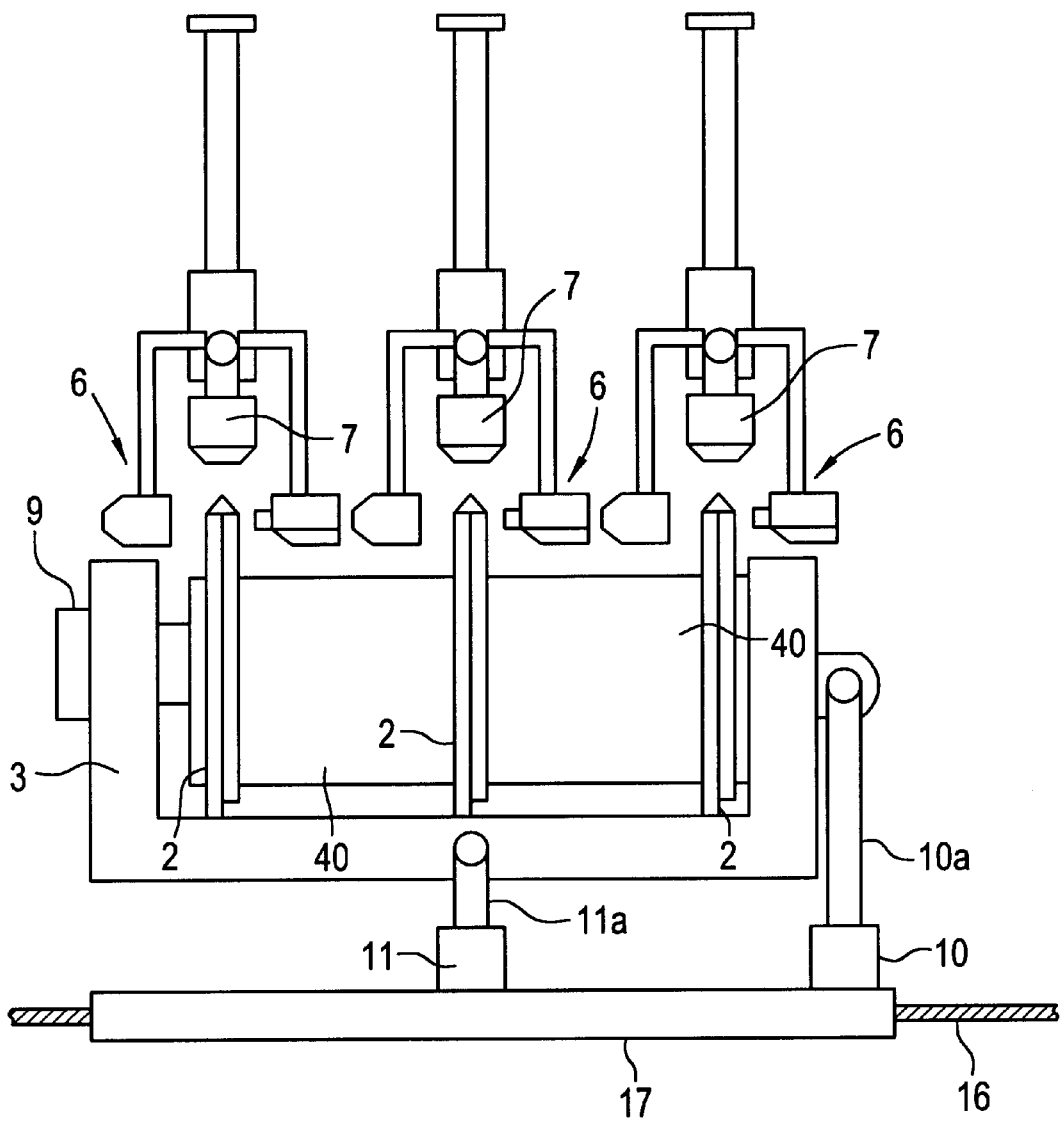
FIG. 13 is a front view partially illustrating an apparatus for sealing a hole of a liquid crystal display cell, in accordance with the second embodiment of the present invention.

FIG. 13 is a partial front view of an apparatus for filling up a hole formed with a liquid crystal display cell for introducing liquid crystal into the liquid crystal display cell therethrough, in accordance with the second embodiment of the present invention.

As illustrated in FIG. 13, the apparatus in accordance with the second embodiment includes the cell holder 3 capable of supporting a plurality of the liquid crystal display cells 2. Spacers 40 are sandwiched between the liquid crystal display cells 2. The apparatus further includes the detection locators 6 by the same number of that of the liquid crystal display cells 2, and the ultraviolet ray radiators 7 by the same number of that of the liquid crystal display cells 2. A pair of the location detector 6 and the ultraviolet ray radiator 7 is associated with each one of the liquid crystal display cells 2.

The other structure of the apparatus in accordance with the second embodiment is the same as the structure of the apparatus in accordance with the first embodiment.

In accordance with the second embodiment, it is possible to concurrently detect a location where the resin reaches in the hole and radiate ultraviolet ray to the resin for a plurality of the liquid crystal display cells, which ensures a higher efficiency in the operation of sealing the holes than an efficiency in the first embodiment.

In FIG. 13, the apparatus is illustrated to include three sets of the location detector 6 and the ultraviolet ray radiator 7. However, it should be noted that the apparatus may include two, four or greater sets of the location detector 6 and the ultraviolet ray radiator 7.

In the above-mentioned second embodiment, the resin applicator 5 applies the resin across the holes of the liquid crystal display cells 2 in turn. However, the apparatus may be designed to include the resin applicators 5 by the same number as that of the liquid crystal display cells 2, in which case, the resin applicators 5 can concurrently apply the resin across the holes of the liquid crystal display cells 2. This ensures a higher efficiency in the operation of sealing the holes than an efficiency in the second embodiment.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-8619 filed on Jan. 20, 1998 including specification, claims, drawings and summary is incorporated herein by reference in its entirety.

What is claimed is:

1. An apparatus for filling up a hole formed with a liquid crystal display cell for introducing liquid crystal into said liquid crystal display cell therethrough, comprising:

(a) a resin applicator for applying a resin to a hole formed with a liquid crystal display cell for introducing liquid crystal into said liquid crystal display cell therethrough, for filling up said hole with said resin, said resin being to be cured when ultraviolet ray is radiated thereto;

(b) a location detector for detecting a location in said hole where said resin reaches; and (c) a ultraviolet ray radiator for radiating ultraviolet ray to said resin when said location detector detects that said resin reaches a predetermined location.

2. The apparatus as set forth in claim 1, wherein said location detector is comprised of a light source, and a chromaticity meter receiving a light emitted from said light source, said location detector detecting a location where said resin reaches, by virtue of variation in chromaticity, detected by said chromaticity meter.

3. The apparatus as set forth in claim 2, further comprising a first polarizing plate fixed to said light source at a surface thereof, and a second polarizing plate fixed to said chromaticity meter at a surface thereof so that said first and second polarizing plates face to each other.

4. The apparatus as set forth in claim 1, further comprising:

(d) a mover for moving said liquid crystal display cell to a first position where said resin is applied to said hole of said liquid crystal display cell, and a second position where said ultraviolet ray radiator radiates ultraviolet ray to said resin;

(e) a cell location detector for detecting that said liquid crystal display cell is located at said first or second position; and (f) a controller for stopping said mover to operate when said cell location detector detects that said liquid crystal display cell is located at said first or second position.

5. The apparatus as set forth in claim 1, wherein said resin applicator is designed to be upwardly and downwardly movable.

6. The apparatus as set forth in claim 1, wherein said location detector is designed to be upwardly and downwardly movable.

7. The apparatus as set forth in claim 1, wherein said ultraviolet ray radiator is designed to be upwardly and downwardly movable.

8. The apparatus as set forth in claim 7, further comprising a connector for connecting said location detector to said ultraviolet ray radiator so that said location detector and said ultraviolet ray radiator are movable together.

9. An apparatus for filling up a hole formed with a liquid crystal display cell for introducing liquid crystal into said liquid crystal display cell therethrough, comprising:

(a) a cell holder for holding a liquid crystal display cell therewith;

(b) a cell positioner for driving said cell holder in such a manner that a hole formed with said liquid crystal display cell for introducing liquid crystal into said liquid crystal display cell therethrough, is upwardly directed;

(c) a resin applicator for applying a resin to said hole for filling up said hole with said resin, said resin being to be cured when ultraviolet ray is radiated thereto;

(d) a location detector for detecting a location in said hole where said resin reaches; and (e) a ultraviolet ray radiator for radiating ultraviolet ray to said resin when said location detector detects that said resin reaches a predetermined location.

10. The apparatus as set forth in claim 9, wherein said location detector is comprised of a light source, and a chromaticity meter receiving a light emitted from said light source, said location detector detecting a location where said resin reaches, by virtue of variation in chromaticity, detected by said chromaticity meter.

11. The apparatus as set forth in claim 10, further comprising a first polarizing plate fixed to said light source at a surface thereof, and a second polarizing plate fixed to said chromaticity meter at a surface thereof so that said first and second polarizing plates face to each other.

12. The apparatus as set forth in claim 9, further comprising:
(f) a mover for moving said cell holder to a first position where said resin is applied to said hole, and a second position where said ultraviolet ray radiator radiates ultraviolet ray to said resin;
(g) a cell location detector for detecting that said cell holder is located at said first or second position; and
(h) a controller for stopping said mover to operate when said cell location detector detects that said cell holder is located at said first or second position.

13. The apparatus as set forth in claim 9, wherein said cell positioner rotates said cell holder into a first position where said liquid crystal display cell horizontally lies, and a second position where said liquid crystal display cell vertically stands and said hole is upwardly directed.

14. The apparatus as set forth in claim 13, wherein said cell positioner is comprised of a first cylinder rotatably connected to a bottom surface of said cell holder, and a second cylinder rotatably connected to a side surface of said cell holder.

15. The apparatus as set forth in claim 9, wherein said resin applicator is designed to be upwardly and downwardly movable.

16. The apparatus as set forth in claim 9, wherein said location detector is designed to be upwardly and downwardly movable.

17. The apparatus as set forth in claim 9, wherein said ultraviolet ray radiator is designed to be upwardly and downwardly movable.

18. The apparatus as set forth in claim 17, further comprising a connector for connecting said location detector to said ultraviolet ray radiator so that said location detector and said ultraviolet ray radiator are movable together.

19. An apparatus for filling up a hole formed with a liquid crystal display cell for introducing liquid crystal into said liquid crystal display cell therethrough, comprising:
(a) a cell holder for holding at least two liquid crystal display cells therewith;
(b) a cell positioner for driving said cell holder in such a manner that holes formed with said liquid crystal display cells for introducing liquid crystal into said liquid crystal display cells therethrough, are upwardly directed;
(c) a resin applicator for applying a resin to said holes for filling up said holes with said resin, said resin being to be cured when ultraviolet ray is radiated thereto;
(d) location detectors in the same number as that of said liquid crystal display cells for detecting a location in each of said holes where said resin reaches; and
(e) ultraviolet ray radiators in the same number as that of said liquid crystal display cells for radiating ultraviolet ray to said resin when said location detectors detect that said resin reaches a predetermined location,
one of said location detectors and one of said ultraviolet ray radiators being associated with one of said liquid crystal display cells.

20. The apparatus as set forth in claim 19, wherein said liquid crystal display cells are sandwiched in said cell holder with a spacer therebetween.

21. The apparatus as set forth in claim 20, further comprising a first polarizing plate fixed to said light source at a surface thereof, and a second polarizing plate fixed to said chromaticity meter at a surface thereof so that said first and second polarizing plates face to each other.

22. The apparatus as set forth in claim 19, wherein each of said location detectors is comprised of a light source, and a chromaticity meter receiving a light emitted from said light source, each of said location detectors detecting a location where said resin reaches, by virtue of variation in chromaticity, detected by said chromaticity meter.

23. The apparatus as set forth in claim 19, further comprising:
(d) a mover for moving said cell holder to a first position where said resin is applied to said holes, and a second position where said ultraviolet ray radiators radiate ultraviolet ray to said resin;
(e) a cell location detector for detecting that said cell holder is located at said first or second position; and
(f) a controller for stopping said mover to operate, when said cell location detector detects that said cell holder is located at said first or second position.

24. The apparatus as set forth in claim 19, wherein said cell positioner rotates said cell holder into a first position where said liquid crystal display cell horizontally lies, and a second position where said liquid crystal display cell vertically stands and said holes are upwardly directed.

25. The apparatus as set forth in claim 24, wherein said cell positioner is comprised of a first cylinder rotatably connected to a bottom surface of said cell holder, and a second cylinder rotatably connected to a side surface of said cell holder.

26. The apparatus as set forth in claim 19, wherein said resin applicator is designed to be upwardly and downwardly movable.

27. The apparatus as set forth in claim 19, wherein each of said location detectors is designed to be upwardly and downwardly movable.

28. The apparatus as set forth in claim 19, wherein each of said ultraviolet ray radiators is designed to be upwardly and downwardly movable.

29. The apparatus as set forth in claim 28, further comprising connectors each for connecting each of said location detectors to an associated ultraviolet ray radiator so that associated location detector and said ultraviolet ray radiators are movable together.

30. An apparatus for filling up a hole formed with a liquid crystal display cell for introducing liquid crystal into said liquid crystal display cell therethrough, comprising:
(a) a cell holder for holding at least two liquid crystal display cells therewith;
(b) a cell positioner for driving said cell holder in such a manner that holes formed with said liquid crystal display cells for introducing liquid crystal into said liquid crystal display cells therethrough, are upwardly directed;
(c) resin applicators in the same number as that of said liquid crystal display cells for applying a resin to an associated one of said holes for filling up said associated one of said holes with said resin, said resin being to be cured when ultraviolet ray is radiated thereto;
(d) location detectors in the same number as that of said liquid crystal display cells for detecting a location in each of said holes where said resin reaches; and (e) ultraviolet ray radiators in the same number as that of said liquid crystal display cells for radiating ultraviolet ray to said resin when said location detectors detect that said resin reaches a predetermined location, one of said location detectors and one of said ultraviolet ray radiators being associated with one of said liquid crystal display cells.

31. The apparatus as set forth in claim 30, wherein said liquid crystal display cells are sandwiched in said cell holder with a spacer therebetween.

32. A method of filling up a hole formed with a liquid crystal display cell for introducing liquid crystal into said liquid crystal display cell therethrough, comprising the steps, in sequence, of:

(a) holding a liquid crystal display cell formed with a hole for introducing liquid crystal into said liquid crystal display cell therethrough;

(b) directing said hole upwardly;

(c) applying a resin to said hole, said resin being to be cured when ultraviolet ray is radiated thereto;

(d) detecting a location where said resin reaches in said hole; and (e) radiating ultraviolet ray to said resin when said resin is detected to reach a predetermined position in said hole.

33. The method as set forth in claim 32, wherein said location is detected in said step (d) by monitoring variation in chromaticity of a light passing through said predetermined position.

34. A method of filling up a hole formed with a liquid crystal display cell for introducing liquid crystal into said liquid crystal display cell therethrough, comprising the steps, in sequence, of:

(a) holding liquid crystal display cells each of which is formed with a hole for introducing liquid crystal into each of said liquid crystal display cell therethrough;

(b) directing each of said holes upwardly;

(c) applying a resin to each of said holes concurrently or in turn, said resin being to be cured when ultraviolet ray is radiated thereto;

(d) detecting a location where said resin reaches in each of said holes; and (e) radiating ultraviolet ray to said resin when said resin is detected to reach a predetermined position in each of said holes.

35. The method as set forth in claim 34, wherein said location is detected in said step (d) by monitoring variation in chromaticity of a light passing through each of said predetermined positions.

* * * * *